United States Patent [19]
Tsay

[11] Patent Number: 5,627,681
[45] Date of Patent: May 6, 1997

[54] ZOOM LENS

[75] Inventor: Rong-Jyh Tsay, Yunlin, Taiwan

[73] Assignee: Industrial Technology Research Institute, Hsinchu, Taiwan

[21] Appl. No.: 489,779

[22] Filed: Jun. 13, 1995

[51] Int. Cl.$^6$ .............................. G02B 15/14; G02B 3/08
[52] U.S. Cl. .............................. 359/686; 359/742
[58] Field of Search .................... 359/686, 742

[56] References Cited

U.S. PATENT DOCUMENTS

| | | | |
|---|---|---|---|
| 3,481,664 | 12/1969 | Takano | 356/686 |
| 4,687,302 | 8/1987 | Ikemori et al. | 359/686 |
| 5,276,553 | 1/1994 | Tatsuno | 359/686 |
| 5,285,317 | 2/1994 | Uzawa | 359/686 |

*Primary Examiner*—Georgia Y. Epps
*Assistant Examiner*—Evelyn A. Lester
*Attorney, Agent, or Firm*—W. Wayne Liauh

[57] ABSTRACT

An improved zoom lens for use in projective image forming systems is disclosed. It comprises, in the order from the object side to the image side, a first lens group with a negative refractive power, a second lens group with a positive refractive power, a third lens group with a negative refractive power, and a fourth lens group with a positive refractive power. The lens groups are disposed such that, during the zooming operation from the wide-angle mode to the telephoto mode, the first, second, and third lens groups are simultaneously moving toward the object side and the fourth lens group stays stationary, and that the first and third zoom lens groups are provided such that the following condition is satisfied: $1.6 < k1/k3 < 4$, where $k1$ is an absolute value of the refractive power of the first lens group and $k3$ is an absolute value of the refractive power of the third lens group. In a preferred embodiment, the fourth lens group comprises a Fresnel lens.

6 Claims, 2 Drawing Sheets

ZOOM LENS

FIELD OF THE INVENTION

The present invention is related to a kind of zoom lens, especially it indicates a kind of zoom lens used by a projective image forming system (e.g. projective television).

BACKGROUND OF THE INVENTION

Investigating the fact that the zoom lens with zoom rate between 1.3~2.0, in general, can be classified into two kinds as described in U.S. Pat. No. 4,516,839, the first kind of zoom lens is composed of the first group having Negative Refractive Power and the second group having positive Refractive Power, these kinds of zoom lenses have a serious shortcoming i.e. too long of its back focal length which makes the small type of lens very difficult the second kind of zoom lens is mainly an improved design in light of the shortcoming of the first kind of zoom lens. In order to shorten the focal length, it employs a telephoto type with the first group having Positive Refractive Power and the second group having Negative Refractive Power. The composition of this type of lens has shorter back focal length wherein the distance between the vertex of the first optical plane and the image plane is smaller than 1 comparing with the effective focal length.

But lens of projection type, because the size of the formed image of the television is far greater than the size of the negative, if one employs directly the mode of the two groups of the above mentioned two kinds of prior art, the zoom stroke is large, the size of the lens can't be diminished; besides, the size of the lens will increase.

SUMMARY OF THE INVENTION

The purpose of the present invention is to provide a kind of zoom lens used by the projective image forming system (e.g. projection television). The zoom lens of the present invention employs the four-group framework of negative, positive, negative, positive which is composed of four lens groups, starting with object side, in sequence, they are the first lens group with Negative Refractive Power, the second lens group with Positive Refractive Power, the third lens group with Negative Refractive Power and the fourth lens group with Positive Refractive Power. Using the zoom lens framework of the present invention can effectively resolve the problems of large zoom stroke and large-size lenses of the foregoing prior arts, it can also resolve the image difference problem and increase the relative hole diameter.

DESIGNATION IN THE DRAWINGS

G1 The first lens group
G2 The second lens group
G3 The third lens group
G4 The fourth lens group
1~10 The lens pieces

DETAILED DESCRIPTION OF THE INVENTION

Figure 1:
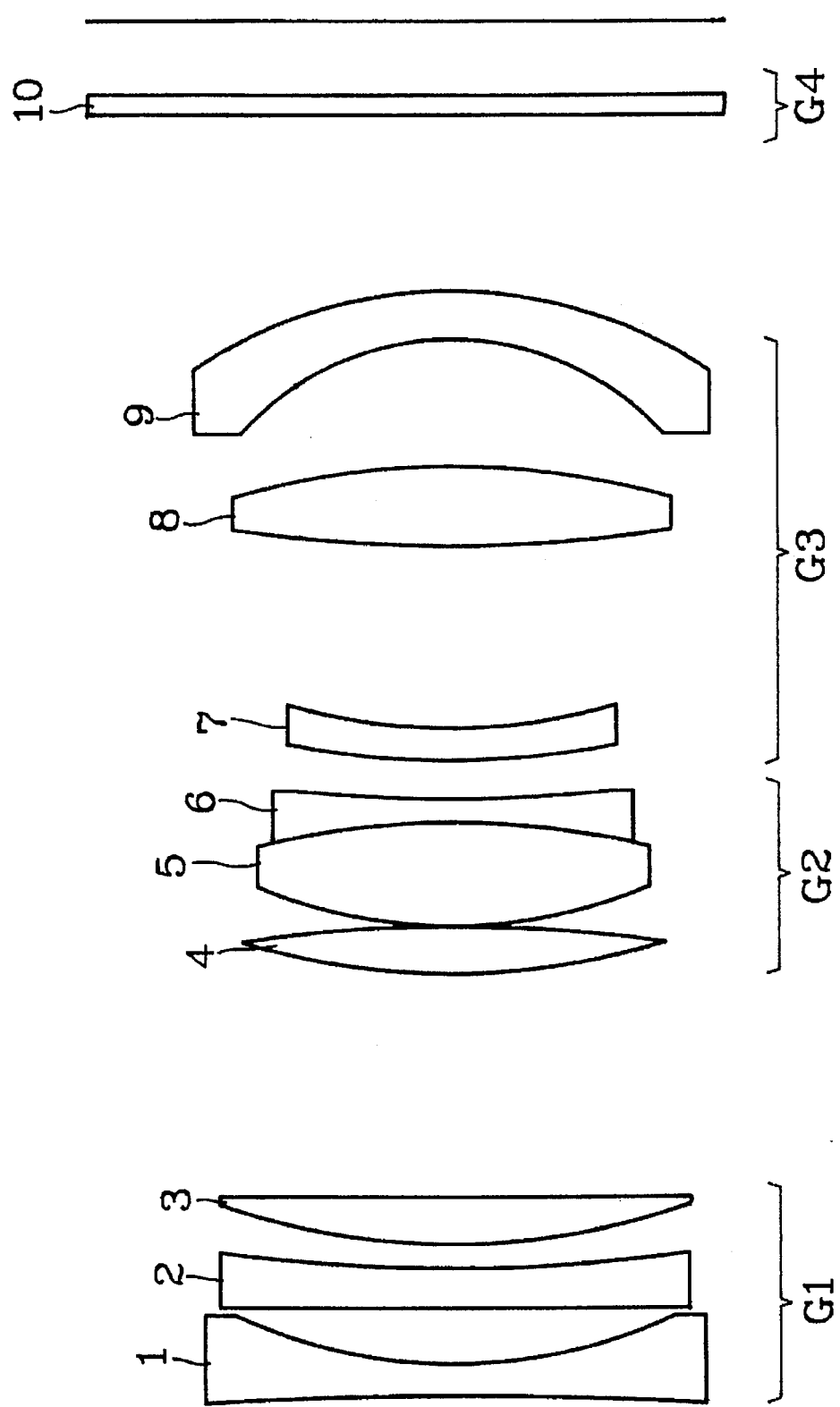
FIG. 1 is the schematic diagram of the lens groups' space layout of the present invention.

As shown in FIG. 1, that is the schematic diagram of the lens groups' space layout of the present invention; it is known from the figure that the present invention is composed of four lens groups, starting with object side, in sequence, they are the first lens group G1 with Negative Refractive Power, the second lens group G2 with Positive Refractive Power, the third lens group G3 with Negative Refractive Power and the fourth lens group G4 with Positive Refractive Power.

The first lens group G1 is further composed of lens pieces 1, 2, 3 of a Positive Refractive Power and a Negative Refractive Power; the second lens group G2 is further composed of lens pieces 4, 5, 6, 7; the third lens group G3 is further composed of lens pieces 7, 8, 9, wherein the first lens closed to the image side is a convex one; the fourth lens group G4 comprise a lens 10, its position is fixed in the course of zooming.

The fourth lens group (i.e. lens 10) is composed of Fresnel lens in one of the embodiment example of the present invention.

Figure 2A:
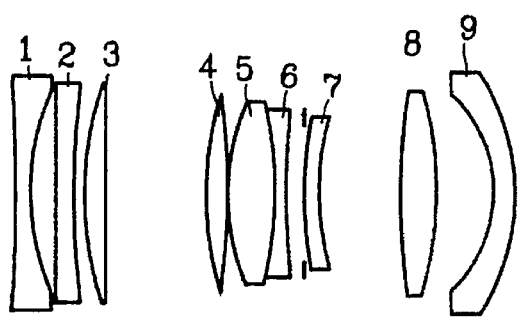
FIG. 2A is the schematic diagram of each lens's location of the present invention when in the wide-angle terminal.
Figure 2B:
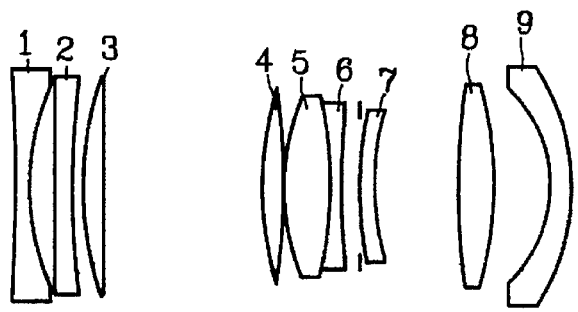
FIG. 2B is the schematic diagram of each lens's location of the present invention when in the middle focal length.
Figure 2C:
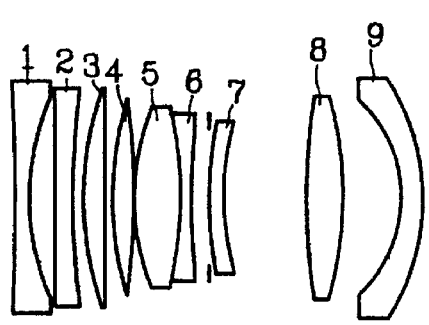
FIG. 2C is the schematic diagram of each lens's location of the present invention when in the telephoto terminal.

In the course of zoom lens assemblage of the present invention; it is in accordance with the following conditions:

$$1.6 < \frac{k1}{k3} < 4$$

where k1 is the Refractive Power of the first lens group
k3 is the Refractive Power of the third lens group During the course of zooming, as it moves from the wide-angle end (as shown in FIG. 2A) toward the telephoto end (as shown in FIG. 2c), the first, second and third lens group G1, G2 and G3 are moving toward the object space simultaneously, in the meantime, the distance between the first lens group G1 and the second lens group G2 is decreasing as the focal length is increasing; the distance between the second lens group G2 the third lens group G3 is slightly increasing and the back focal is increasing but the location of the fourth lens group G4 is fixed. The zooming operation of the present invention satisfies the following conditions:

$$0.5fW < |f1| < 3fT$$

$$0.5fW < |f3| < 3fT$$

where fw is the focal length of the total system at the wide angle end
fT is the focal length of the total system at the telephoto end
f1 is the focal length of the first lens group
f3 is the focal length of the third lens group Therefore, in the course of zooming, it is accomplished changing through the distances between the first lens group and the second lens group, the second lens group and the third lens group and the fourth lens group. As the zooming process moving from the wide-angle toward the telephoto, the first, second and third lens groups are moving toward the object side but the location of the fourth lens group is fixed.

The zoom lens, which is made according to the present invention, can make the total length of zoom shorter and the FNO smaller.

DESCRIPTION OF AN EMBODIMENT EXAMPLE

| SURFACE | RADIUS | THICKNESS | N | Abbe No. |
|---|---|---|---|---|
| 1 | −449.52243 | 4.000000 | 1.741060 | 45 |
| 2 | 64.93259 | 7.010745 | | |
| 3 | 791.82499 | 5.822189 | 1.742862 | 44.8 |
| 4 | 209.08832 | 2.442789 | | |
| 5 | 89.63345 | 5.644970 | 1.718216 | 29.3 |
| 6 | 672.85307 | 29.288980(*2) | | |
| 7 | 86.66644 | 6.100000 | 1.717420 | 46.9 |
| 8 | −226.71036 | 0.296025 | | |
| 9 | 53.23270 | 13.499513 | 1.487701 | 70.3 |
| 10 | −114.15475 | 3.000000 | 1.740199 | 29.3 |
| 11 | 133.34274 | 5.607067 | | |
| 12 | infinitive | 1.016705(*3) | | |
| 13 | 165.47226 | 3.725753 | 1.722213 | 35.5 |
| 14 | 70.27022 | 22.672875 | | |
| 15 | 150.32043 | 9.804426 | 1.515172 | 56.8 |
| 16 | −99.53541 | 16.422099 | | |
| 17 | −36.56901 | 5.760321 | 1.744000 | 447 |
| 18 | −57.93851 | 62.625364(*4) | | |
| 19 | infinitive | 2.100000 | 1.492000 | 58.4 |
| (*1)20 | −53.24746 | 8.100000 | | | where

SURFACE - - - The curve surface of each lens (a surface of lens)

RADIUS - - - Radius of curvature

THICKNESS - - - Thickness of lens

Abbe No. - - - Glass material

N - - - The Index of the Refraction whereto the aspherical surface characteristic of the 19th lens surface can be expressed by the following polynomial formula:

$$Z = \frac{C*Y^2}{1 + [1 + (1-C1)*C^2*Y^2]^{1/2}} + C3*Y^4 + C4*Y^6 + C5*Y^8 + C6*Y^{10} + C7*Y^{12}$$

where (*1): Fresnel Surface (threaded curve surface)

Z: Convex or concave amount

C: Curvature (V=1/R)

Y: the radial height of optical surface

C1: −2.0839E+01

C3: −5.6649E−06

C4: 3.4747E−09

C5: −1.0216E−12

C6: 1.5897E−16

C7: −1.2098E−20

C8: 3.0000E−01

| width of pitch (thread width on the threaded curve surface) | | | |
|---|---|---|---|
| (*2)THI S6 (MM) | 29.28898 | 11.92644 | 1.41862 |
| (*3)THI S12 (MM) | 1.01671 | 1.71068 | 2.16345 |
| (*4)THI S18 (MM) | 62.62536 | 80.01553 | 102.58417 |
| EFL (MM) | 103.9458 | — | 163.0009 |
| FNO | 3.2500 | — | 4.3300 |
| ANG (DEGREE) | 27.8843 | — | 18.9542 | where

THI is the distance between lenses

EFL is the focal length

FNO is the aperture

ANG is the angle of the field

The foregoing is the embodimental description of the present invention, one who is versed in this kind of technique can undertake various modifications and applications thereof, it should be appreciated that any of these changes should not be disengaged from the spirit of this creative work and the scope of the patent defined as follows.

What is claimed is:

1. A zoom lens system for use in projective image forming systems comprising, in order from an object side, a first lens group with a negative refractive power, a second lens group with a positive refractive power, a third lens group with a negative refractive power, and a fourth lens group with a positive refractive power; wherein said first, second, third, and fourth lens groups are disposed such that, during a zooming from a wide-angle mode to a telephoto mode, said first, second and third lens groups are simultaneously moving toward the object side and said fourth lens group stays stationary, and said first and third zoom lens groups are provided such that:

$$1.6 < \frac{k1}{k3} < 4$$

where k1 is an absolute value of the refractive power of said first lens group and k3 is an absolute value of the refractive power of said third lens group;

further wherein said fourth lens group comprises a Fresnel lens.

2. A zoom lens system for use in projective imaging forming systems as claimed in claim 1 wherein said third lens group comprises a first lens piece which is closest to an image side of said third lens group, said first lens piece being a meniscus-shaped negative lens with a convex surface facing said image side of said third lens group.

3. A zoom lens system for use in projective imaging forming systems as claimed in claim 1 wherein said first lens group comprises a lens with positive refractive power and another lens with a negative refractive power.

4. A zoom lens system for use in projective imaging forming systems as claimed in claim 1 wherein said zoom lens system satisfies the following conditions:

$$0.5 f_W < |f_3| < 3 f_T$$

where $f_W$ is the focal length of said zoom lens system at the wide-angle mode, $f_T$ is the focal length of said zoom lens system at the telephoto mode, and f3 is the focal length of said third lens group.

5. A zoom lens system for use in projective imaging forming systems as claimed in claim 1 wherein said zoom lens system satisfies the following conditions:

$$0.5f_W < |f_1| < 3f_T$$

where fW is the focal length of said zoom lens system at the wide-angle mode, fT is the focal length of said zoom lens system at the telephoto mode, and f1 is the focal length of said first lens group.

6. A zoom lens system for use in projective imaging forming systems as claimed in claim 1, wherein said Fresnel lens satisfies the following conditions:

$$90 < f_F < 140$$

where $f_F$ is the focal length of the Fresnel lens.

* * * * *